July 10, 1928.

C. W. STANCLIFFE

FUEL CONTROL FOR LIQUID FUEL BURNERS

Filed June 18, 1923   3 Sheets-Sheet 1

1,676,933

INVENTOR
Cecil W. Stancliffe
by Wright, Brown, Quinby & May
Att'ys

July 10, 1928.

C. W. STANCLIFFE

FUEL CONTROL FOR LIQUID FUEL BURNERS

Filed June 18, 1923

INVENTOR
Cecil W. Stancliffe

July 10, 1928.
C. W. STANCLIFFE
FUEL CONTROL FOR LIQUID FUEL BURNERS
Filed June 18, 1923  3 Sheets-Sheet 3
1,676,933
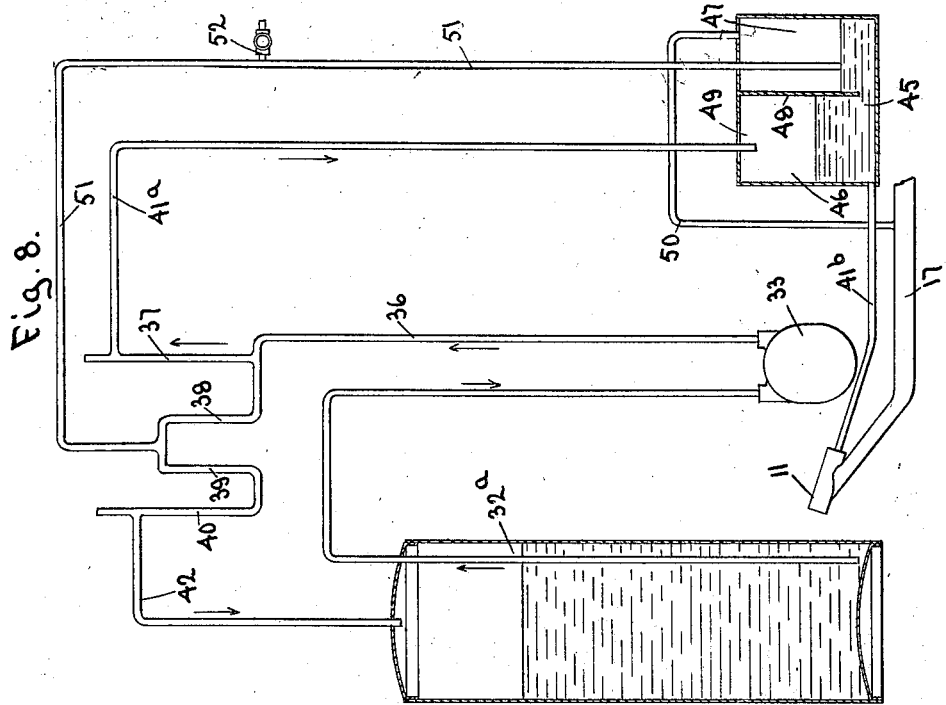
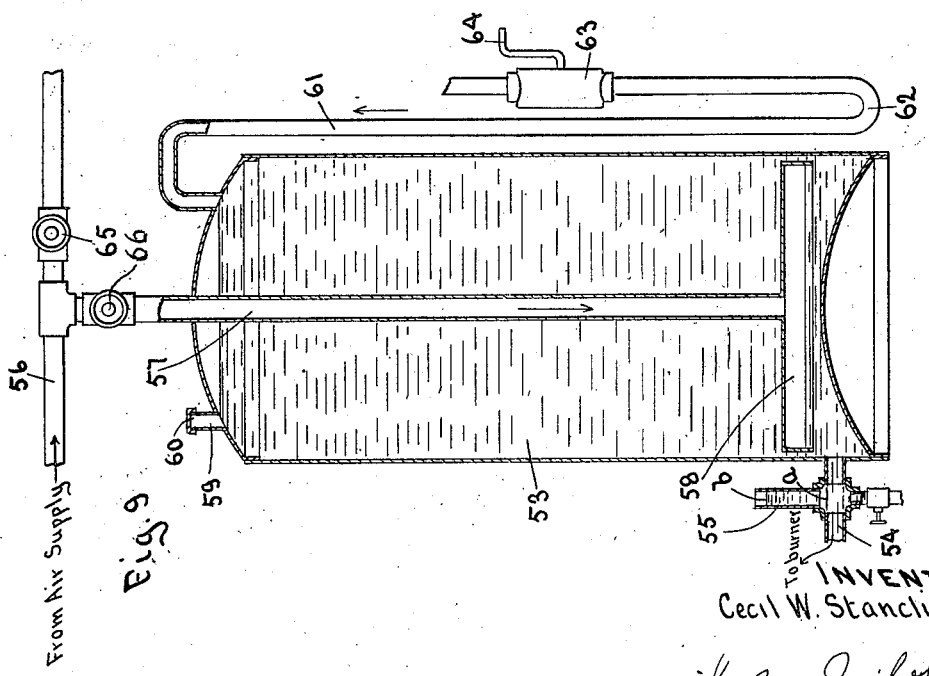
INVENTOR
Cecil W. Stancliffe
by Wright, Brown, Quinby & Hay
attys Patented July 10, 1928.

1,676,933

UNITED STATES PATENT OFFICE.

CECIL W. STANCLIFFE, OF NEW YORK, N. Y., ASSIGNOR TO VALVELESS OIL BURNER CORPORATION, OF NEW YORK, N. Y., A CORPORATION OF NEW YORK.

FUEL CONTROL FOR LIQUID-FUEL BURNERS.

Application filed June 18, 1923. Serial No. 646,088.

This invention relates to apparatus for burning oils and other liquid fuels, and for controlling the supply of fuel according to the demand for heat and other circumstances. It is particularly concerned with combustion systems in which the air for supporting combustion is first put under pressure by a blower or other suitable means and is then separately conveyed to the place of combustion or of admixture with the fuel. The object of the invention is to control the delivery of fuel automatically by means of this air pressure, or by means of pneumatic pressure otherwise developed, without the use of valves, and in a simple and effective way; so that, when the air pressure subsides, the flow of fuel to the burner will immediately cease, or be diminished in proportion to the reduced flow of air, and there will be neither a continuance of combustion with insufficient air supply, nor the accumulation of unburned fuel in the furnace.

In developing the invention which is here illustrated I have had particularly in mind the burning of oil for heating purposes and for generation of steam power, and for that reason I will generally in the following specification refer to the liquid fuel, which is controlled by means of this invention, as oil, to the burner as an oil burner, and to the controlling means as the oil control, or by terms of similar import. Within the definition of the term "oil" as thus used I include all oils which are capable of being burned as fuel and of being controlled by the means which forms the gist of the invention, whether the oil is crude petroleum, kerosene, so-called furnace oil, fuel oil, or any other mineral, vegetable, or animal oil. Even so, however, I do not limit the protection which I claim to apparatus designed and intended for use with oil only, rather than any other liquid fuel, for I intend to protect all the novel features of the invention in all uses to which they are capable of being put.

The exact nature of the invention and the characteristics in which the same consists can best be stated in connection with a description of definite embodiments thereof. Such a description is given in the following specification with reference to the drawings forming a part thereof.

In the drawings,—

Figure 8 is a diagram showing the application of the same essential invention to condition in which the supply tank is at a higher level than the burner.

Figure 9 is a form of oil control applied to a vacuum gravity supply tank.

Like reference characters designate the same parts in all the figures wherever they occur.

Figure 1:
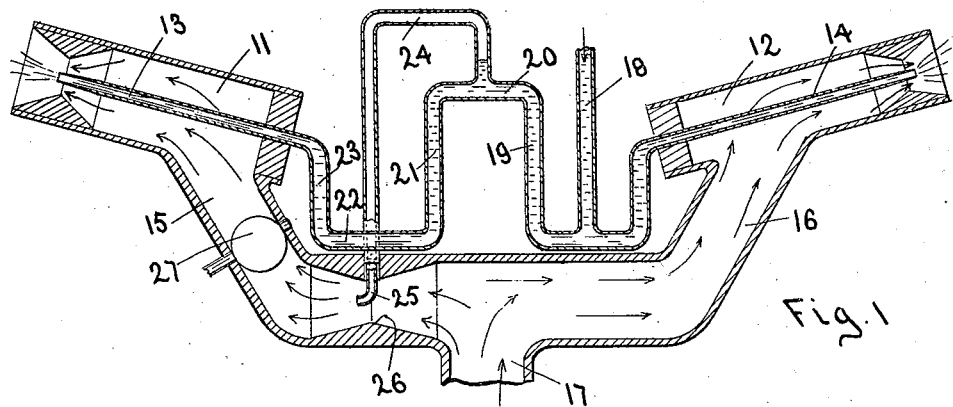
Figure 1 is a diagrammatic sectional view showing two oil burners in an installation wherein one of such burners is a constantly burning pilot, combined with one form of the invention.
Figure 2:
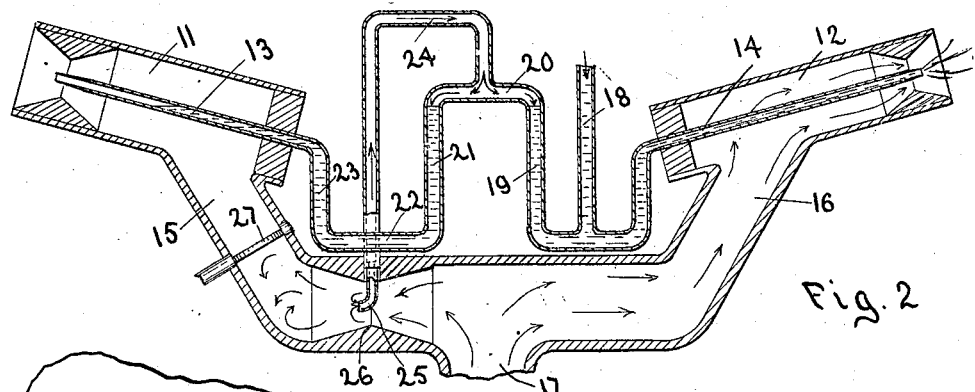
Figure 2 is a similar view illustrating the operation of the control means to extinguish one of the burners when the air supply thereto is cut off.

In all the manifestations of the invention here illustrated, air and oil are conducted through separate conduits to the place of combustion and are there discharged in mingled condition; while the pressure of the air supplied to the burner is applied directly to control the oil flow, causing a flow of oil when air flows to the burner and stopping the flow of oil when the air flow ceases.

In the diagrammatic view shown in Figures 1 and 2, 11 and 12 represent two oil burners, having respectively interior conduits or nozzles 13 and 14 for conveyance of oil, and outer shells or casings enclosing the terminals of such conduits, which casings are supplied with air under pressure by branches 15 and 16, respectively, from a common source or air trunk 17. Although in this diagrammatic view the two burners are resolved into the same plane and so are directed oppositely to each other, for convenience of illustration it is intended in practice that they be placed side by side, and directed in parallel into the furnace. The burner 12 is designed to be used as a pilot and so is kept constantly supplied with oil and burns continuously; and the burner 11 is the main burner which is ignited only when the full demand for heat arises. Therefore, the latter burner only is governed by the control means which I will now describe.

Oil is supplied to both burners from a common source typified by the upright pipe 18, being delivered directly thence to the conduit 14 of the pilot burner, and passing to the main burner through an upright pipe 19, an elevated crossover section 20, a depending pipe 21, a low level crossover 22, and a rising section 23, the whole constituting a double U-tube. In this combination the crossover section and pipes 19 and 21 form a rising or inverted loop, or inverted U-tube. A branch pipe 24 leads upwardly from the highest part of the double U-tube, which is the crossover 20, and then passes into the branch 15 of the air conduit, terminating in a nozzle 25 having a lateral outlet directed the same way as the flow of air to the main burner. This nozzle is surrounded by a constriction 26, which forms a Venturi tube in this part of the air conduit, whereby an increase in the velocity, and reduction of the pressure, is effected in the air flowing through this section of the conduit.

A valve or damper 27 is located in the conduit 15 between the burner and the Venturi tube 26. This valve may be operated by hand or, preferably, by automatic means controlled by the pressure generated in the heater or by the temperature of the apartments being heated, or otherwise. Operative means for the control of valves and dampers by pressure or temperature are well known and any such may be applied to the valve 27 by those skilled in the art, according to the conditions under which this valve may be closed or opened. All that is material to the present disclosure is that when the valve 27 is open, air to support combustion is delivered to the burner, while when the valve is closed the air supply is shut off.

The double U-tube and its connection with the air conduit, above described, permit or prevent delivery of oil to the burner, according as the valve 27 is open or closed. When this valve is open, the flow of air through the Venturi tube causes the pressure in the nozzle 25 and connection 24 to be less than that in the conduit; but when the valve is closed the pressure in the connection 24 becomes equal to that in the conduit. There is thus a substantial difference of pressure in the connection 24, according as the valve 27 is open or closed. The height of the connection 20 in the double U-tube is so determined, having regard to the head or pressure under which oil is delivered to the supply pipe 18, that in the one case the oil floods the connection 20 and passes over to the burner, while in the other case an air lock is formed in the top of the double U-tube which prevents oil from flowing. These two conditions are graphically illustrated in Figures 1 and 2 respectively.

Figures 3, 4:
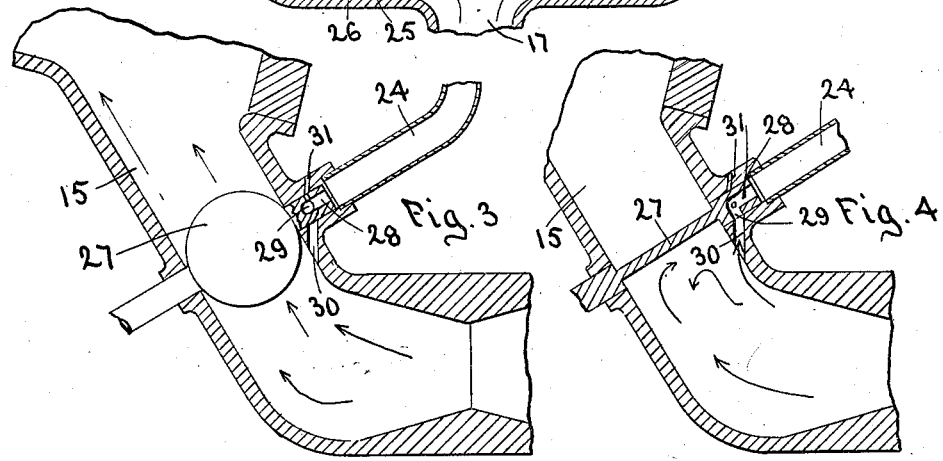
Figures 3 and 4 are detail sectional views illustrating a modification in one of the details of the controlling means.

I may use other means than the particular one just described for bringing about or removing the air lock. One such is shown in Figures 3 and 4 and consists in a valve 28 which is arranged in the branch connection 24 from the air conduit to the double U-tube, and conveniently is associated with the air valve 27 for control by and with the latter. Such valve 28 has a port 29 registering with a passage 30 in the conduit wall when the air valve is closed. The passage 30 opens into the interior of the conduit and, when the valve is closed, passes the full air pressure to the double U-tube, creating the air seal described. When the burner air valve 27 is opened, the branch connection valve 28 is closed to the air conduit, but opened through a vent port 31 to the atmosphere, allowing the escape of the sealing air and permitting passage of the oil through the upper crossover section of the double U-tube.

Figure 5:
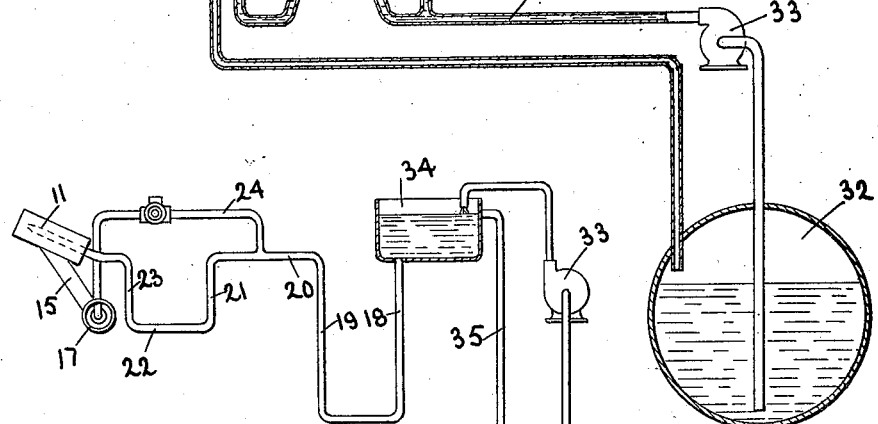
Figure 5 is a diagram illustrating the control means shown in the preceding figures as combined with a suitable oil supply.

Figure 5 illustrates diagrammatically means for maintaining a constant supply of oil, the flow of which to the burner is controlled in the manner described. Here 32 is a tank which is located at any convenient point, below the level of the burner, and from which oil is taken by a pump 33 and delivered to a gravity tank 34 from which the burner feeding pipe 18 leads. The pump delivery is greater than the needs of the burners, and the excess is returned to the supply tank through an overflow pipe 35 whereby a constant level is maintained in the gravity tank.

Figure 6:
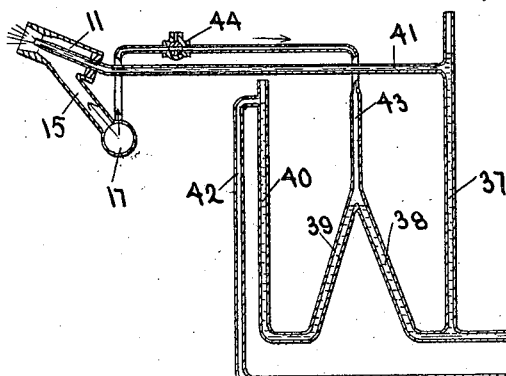
Figure 6 is a diagram showing an oil supply tank and burner in combination with an oil control embodying the principles of this invention in a specifically different form and arrangement.

In Figure 6 I show another form of means operating according to the same principle; and here, as before, the supply tank is designated 32 and the pump 33. The delivery pipe 36 from the pump leads to a double U-tube, or a connected pair of U tubes, of the same character as that already described. One of the U-tubes consists of the upright leg or standpipe 37 and the rising tube 38, the delivery pipe being connected to the bottom of this U-tube arrangement. The other U-tube consists of the legs 39 and 40.

A branch 41 leads from the leg or standpipe 37 to the burner 11 and discharges into the latter. A branch 42 from the leg or upright 40 of the second U-tube leads back to the supply tank and forms an overflow return to the tank. The connection of branch 42 with the leg 40 is at a lower level than the connection of leg 41 with leg 37. Both legs 37 and 40 are open, or vented, to the atmosphere above their junction points with their respective branches. The legs 38 and 39 of the two U-tubes are connected at a level above the lowest parts of the U-tube, but below the connection of the return pipe 42 with the leg 40; and they are also connected with a pipe 43 which rises from the junction of these legs and extends to a connection with the air main 17. They form an inverted loop or inverted U-tube as an intermediate part of the double U-tube device. Such inverted loop is in series connection with the rising outer legs 37 and 40 of the U-tubes.

Figure 7:
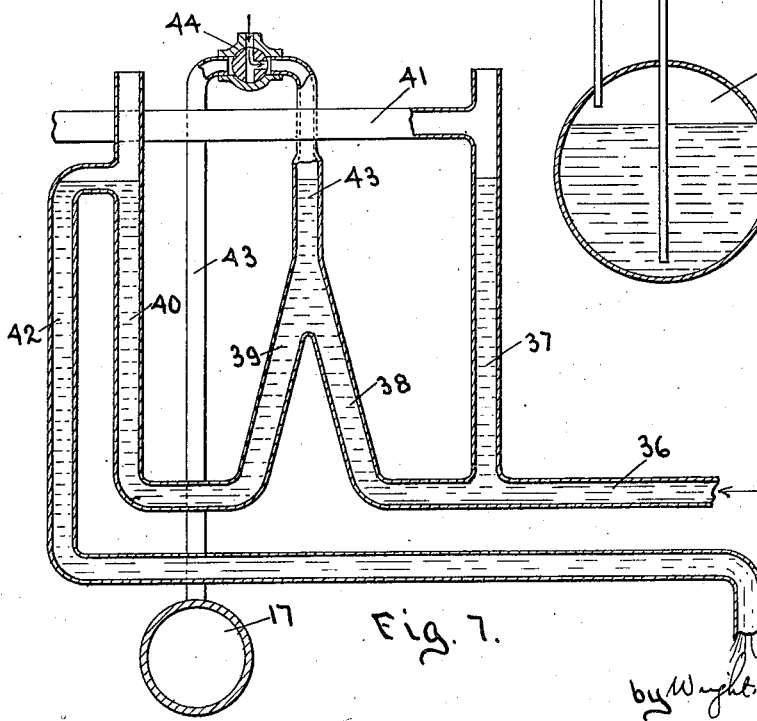
Figure 7 is an enlarged view of the control means shown in Figure 6, further illustrating the mode of operation of this control means.

A three-way valve 44 is interposed in the conduit 43 and has a vent to the atmosphere. This valve may be set so as either to close the atmospheric vent and open the passage from the air main to the double U-tube, as shown in Figure 6, or so as to close this passage and open the junction of the two U-tubes to the atmosphere, as shown in Figure 7. It may be noted that Figure 7 is essentially similar to Figure 6 and differs therefrom only in that it shows the piping on a larger scale, omits the supply tank, pump and burner, and shows the three-way valve in a different position.

If there is no excess air pressure in the air main 17 and the valve is set to open the passage therefrom to the double U-tube, or if the valve is set to connect the double U-tube with the atmosphere, oil can rise in the double tube only to the overflow point, that is, the junction which the return pipe 42 makes with the leg 40. This is due to the fact that the capacity of the return pipe is made large enough to take the entire delivery of the pump. Then the oil rises in all the legs of the double U-tube to the height of the overflow, but not to the height of the burner supplying branch 41, and no oil is supplied to the burner. But if the air main contains air under pressure and the passage through the connection 43 is open thereto, the same air pressure is imposed on the oil in that part of the connecting pipe 43 which rises from the junction of the U-tubes.

I may make the relative heights of the junction points of any values desired, and in any specific case I make the vertical distance between the junction of pipe 41 with the standpipe 37 and the junction of the legs 38 and 39 less than the height of a column of oil which will balance the air pressure supplied to the burner in that case. Hence when the pressure of air is applied to the double U-tube, the oil in the connection 43 and legs 38 and 39 is depressed, while that in the standpipe 37 is raised. In leg 38 the oil level will descend only to the junction of this leg with leg 39, and in leg 37 will rise to a height above said junction sufficient to balance the air pressure, being maintained at these levels by the oil supplied by pump 33, and being unable to rise any higher on account of overflow from leg 38 into leg 39. But in the leg 40 the oil is unable to rise any higher than to the outlet into the overflow pipe 42, wherefore the oil column in leg 39 is depressed until its head stands at a vertical distance below said overflow connection equal to the oil head equivalent to the air pressure. The oil in U-tube 39—40 furnishes a seal which maintains the full air pressure on top of the oil in leg 38, as required to support the column in leg 37 at the desired height; and to serve this purpose the depth of the U-tube 39—40 below the overflow connection must be as great as the oil head equivalent to any air pressure used in practice with the apparatus. The oil displaced at this time in U-tube 39—40 passes through the overflow. This displacement of oil in standpipe 37, plus the accretions of oil constantly being supplied thereto by the pump, causes oil to flow into branch 41 and thence to the burner. So long as the air pressure persists in connection 43, oil can be raised by the pump in leg 38 only to the height of the junction of this leg with leg 39, and it must be raised in leg 37 to a height above the opening of branch 41 before overflow into U-tube 39—40 and return to the tank can take place. If the delivery capacity of the pump is no more than enough to supply the burner, passage of oil to the overflow is altogether prevented by the air lock thus formed; otherwise the air lock diminishes the return flow to just the excess of oil supplied by the pump beyond the requirements of the burner. On the other hand, if the air pressure is diminished by shutting down the blower, shifting the valve 44, or from any other cause, the loss of pressure allows the oil level in 37 to subside below the passage to the burner, and the entire delivery of the pump is returned to the tank.

The valve 44 is ordinarily kept in the position shown in Figure 6, where it opens the passage from the pipe 43 and closes the atmospheric vent; but it affords a means operable by hand, or by any suitable control mechanism, to shut off the oil without interrupting the air flow, when desired. And the air pressure in pipe 43 may also be controlled by the same sort of means as shown in Figures 3 and 4, and antecedently described, so arranged as to admit air pressure to pipe 43 or exclude pressure therefrom, when air is respectively admitted to or excluded from the burner.

Standpipe 37 rises to any desired height above the entrance to the burner feed pipe 41, whereby it is possible to maintain a greater or less head of oil above this entrance by imposing a higher or lower pressure on the air in connection 43. The result of so doing is to feed more or less oil to the burner with generation of more or less heat; and, when the controlling pneumatic pressure is taken from the combustion air supply, the oil feed is made automatically proportionate to the air supply, whereby a higher or a lower fire may be produced with one control and without valves. For instance, a mere variation in the speed of the blower is sufficient for this purpose.

This apparatus is important and valuable, because it not only causes the oil supply to the burner to be cut off entirely when necessary, as in the case first described, but it also enables the flow of oil to the burner to be controlled by any prearranged air pressure, and varied by any prearranged air pressure variation.

Instead of the pump 33 as a means for feeding oil, I may use a gravity tank or other means adapted to supply oil under a head at least great enough to raise it to the level of the burner feed pipe 41; the arrangement of the double U-tube, overflow pipe, and connection from the air main, being then substantially as herein shown and previously described. The pump 33 thus typifies any means for delivering oil under such a head, and the overflow or return pipe 42 typifies any means for normally carrying away the oil delivered by such means except when the passage to the carrying away means is interrupted or obstructed by air lock, as described.

In each of the forms of the invention thus far described, the connected parts of the U-tubes form, in effect, an inverted U-tube, or raised loop, to the highest part of which air is supplied under certain circumstances to form an air lock and prevent flow of oil, and from which at other times the air is released so as to permit flow of oil. In each case so described the air pressure for creating this air lock is supplied from the conduit which delivers air to the burner for supporting combustion, but it is within my contemplation to provide air or other gas under pressure for this purpose from a different source. In any event, whether pneumatic pressure for controlling the oil flow is obtained from the burner supplying conduit or from another source, and whether the pressure which creates the air lock is applied by closing the passage to the burner, as in the case first described, or is applied while air under pressure continues to flow to the burner, as in the case last described, a very efficient, quickly acting, and yet simple control is afforded by which the oil may be shut off from the burner and again admitted thereto, without the use of valves in any part of the system which contains oil. So far as the function of regulating or controlling the flow of oil to the burner is concerned, the inverted loop or inverted U-tube (19—20—21, or 38—39, respectively) is, in either case, the important factor which will operate in the ways and with the results described in the presence, of the upright U-tube comprised by the pipe sections 21—22—23 or the legs 39—40, respectively. Said last named pipe sections and legs form seals, preventing escape of air and loss of the pneumatic pressure, of which the one first described prevents air from being by-passed through the nozzle into the furnace when the main air trunk is closed off, and the one last described prevents flow from the air supply into the oil tank.

The foregoing description applies to conditions where the main tank is located at a level lower than the burner, but not where the tank is higher than the burner. To meet the latter condition I have devised a form of apparatus, shown diagrammatically in Figure 8, in which is employed the same principle of the double U-tube, already described, with other apparatus.

Here 32ª represents the tank, 33 the pump, 36 the delivery pipe from the pump, 37, 38, 39, and 40 the legs of the double U-tube having an intermediate inverted loop, and 42 the overflow return pipe to the tank, substantially as described in connection with Fig. 6. In this, as well as in all the other instances described, where oil is drawn by a pump from a tank, the tank is always open to the atmosphere. The double U-tube, being above the tank in order to ensure gravity return of the excess oil, is far above the burner and, if directly connected to the burner, would give rise to a pressure head greatly in excess of that which it is desired to impose on the oil delivered at the burner. Thus, in order to make effective use, in such circumstances, of the principles of oil control according to this invention, I have added a reservoir 45 having two chambers 46 and 47, divided from one another by a partition 48 connected with the walls of the reservoir at the top and opposite sides, but terminating, in part at least, short of the bottom. The chamber 46 is open to the atmosphere through a vent 49 or by other suitable means, and receives oil from the standpipe 37 by a branch 41ª which corresponds to the branch 41 of Figures 6 and 7. A pipe 41ᵇ conducts oil from chamber 46 to the burner. The chamber 47, on the other hand, is closed to the atmosphere, but is connected with the pressure air main 17 or other suitable source of pneumatic pressure, by a pipe 50. A pipe 51 runs from the junction of the U-tube legs 38 and 39 (or inverted loop) into the chamber 47 and terminates at the maximum level to which oil is to be allowed to rise in said chamber. A branch 52 opens from the pipe 51 to the atmosphere and may be controlled by a valve. This branch has an orifice which serves as a bleeder to permit escape of excess pneumatic pressure from pipe 51 to the atmosphere, but its discharge capacity is not so great as the conducting capacity of that pipe or of pipe 50.

In this apparatus the function of the double U-tube is to return to the tank all oil delivered by the pump except when an air lock is produced in the junction of the two U-tubes. Such an air lock occurs when the oil level in the chamber 47 is below the entrance of the pipe 51 and air under pressure is contained in the air main 17. Then air pressure from the air main 17 is transmitted through the pipe 50, chamber 47 and pipe 51 to the inverted loop of the double U-tube, forming an air lock therein, which causes oil to rise in the standpipe 37 and flow through pipe 41ᵃ to the chamber 46, according to principles already described.

A higher level of oil exists in the chamber 46 than in chamber 47, due to the fact that the former chamber is open to the atmosphere and the latter chamber is sealed and contains air under pressure. The oil delivered by pipe 41ᵃ rises equally in both chambers, however, after a difference in head equal to the air pressure has been obtained, until it seals the lower orifice of pipe 51. Then no air under pressure can enter pipe 51 and the excess pressure escapes through the vent in branch 52, the air lock in the inverted U-tube 38, 39 is released and the oil supply to the reservoir is cut off. Thus a constant supply of oil is maintained in the chamber 46 at a constant level, higher than that in chamber 47, so long as the air pressure in the main 17 continues at the predetermined degree. If the air supply fails, by stoppage of the blower or from any other cause, the pressure in chamber 47 drops to atmospheric, and oil flows back from chamber 46 until the level in both chambers is the same, while oil feed to chamber 46 is interrupted by simultaneous release of the air lock in the double U-tube. The burner is located with its oil delivery point or orifice at such a height in respect to the two oil levels, above described, in chamber 46 that, when oil stands at the high lever it will flow to the burner under moderate pressure and, when at the low level, it will not flow thereto, but will run back somewhat from the burner orifice. Thus the apparatus last described causes a sufficient supply of oil to be fed to the burner under sufficient pressure, but not under excessive pressure; and when the air supply fails, causes the flame to be instantly extinguished.

As the maximum height of oil in chamber 46 is a function of the air pressure, and is limited with respect to a fixed level in chamber 47 (that of the orifice to pipe 51), this apparatus enables the oil feed to be automatically regulated for a higher or a lower fire by imposing on the combustion air supply, or other source of pneumatic pressure, a respectively higher or lower pressure above that which is too low to maintain any fire.

All these results are accomplished by pneumatic pressure alone, and without the operation of valves, or float devices. After the fire has been extinguished by subsidence of air pressure, no possibility of flooding the furnace with oil exists, for at such times the pipe 51 is sealed, and its orifice more or less submerged by oil which has flowed back to chamber 47 from chamber 46. Only by again applying pneumatic pressure in chamber 47 can the oil head be raised to the level necessary to feed the burner. Such pressure may, however, be derived from other sources than the combustion air supply, within the scope of my claim for this phase of the invention.

It will be noted that the apparatus last described differs from that shown in Figures 6 and 7, principally in the location of the burner at a low point in respect to the tank and in the insertion of the reservoir 46, 47 in the oil conducting and air conducting pipes. Such insertion or interpolation amounts, in effect, to dividing the burner feeding oil pipe 41 into two parts, 41ᵃ and 41ᵇ, and interposing the chamber 46 between these parts; dividing the air conducting pipe 43 into two parts, namely, pipes 50 and 51, making the chamber 47 virtually a part of the continuous conduit but arranging it so that a seal is provided by the oil in said chamber according to the height of the oil level; and connecting the chambers 46 and 47 together as an upright U-tube. In this way the oil pressure at the burner is maintained at the desired low maximum, and the oil reservoir is prevented from overflowing.

Figure 9 illustrates a mode of controlling the flow of oil from a vacuum tank to a burner, in a manner such that when the pressure of the air supplied for supporting combustion diminishes below a predetermined value, the feed of oil to the burner is not only cut off, but the oil already in the pipe leading from the tank to the burner is drawn back and the flame instantly extinguished. Here 53 represents the tank, 54 a pipe leading from the lower part of the tank to the burner, and 55 a rising pipe or standpipe connected to the burner feeding pipe 54 and rising to a sufficient height, its upper end being open to the atmosphere. 56 represents a pipe containing air or other gas under pressure, and preferably connected with the source of pressure air supplied to the furnace, or with the blower or pump which generates pressure in the air supply. A pipe 57 leads into the lower part of the tank from pipe 56 and terminates in the upper part of an inverted pan 58. The last-named member may be considered as a chamber closed at its top and sides, but open at the bottom, providing an enlarged terminal orifice for pipe 57. It has a relatively large horizontal area in proportion to the transverse area of the tank, but is shallow in its vertical dimension, whereby it does not occupy any great proportion of the volume of the tank. This inverted pan or chamber is located near the bottom of the tank, with its side walls sufficiently separated from the sides of the tank at one or more points to permit free passage of air from within the pan around its edges and thence to the upper part of the tank.

Two alternative means for filling the tank are shown, one being a spout or nozzle 59 closed by a removable cap 60 and the other being a pipe 61 entering the top of the tank and extending downward to form a sealing loop 62 between the tank and a pump 63. This pump may be of any suitable character and is here shown conventionally as a gear pump adapted to be operated manually by means of a crank 64 to draw oil from the source of supply and force it through the loop 62 and pipe 61 to the tank.

In normal operation the tank is closed against influx of atmospheric air except through the standpipe 55 and pipe 57. If it be assumed that the air pressure in pipe 57 is atmospheric, then oil can enter the inverted pan 58 and rise only to the height therein at which the atmospheric air plus the column of oil in the pan balances the column of oil in the tank plus the air pressure at the top of the tank. In other words, a partial vacuum exists in the top of the tank, of which the absolute pressure is less than the atmospheric pressure by the difference in head between the column of oil in the tank and the column of oil in the inverted pan. Similarly oil will rise in the open standpipe 55 until the same sort of balance is obtained. Under the conditions now assumed the level in the standpipe will be approximately at the mark $a$. The oil delivery point of the burner is placed above the level $a$ in order that when oil stands at this level it will not be discharged at the burner.

Now, if air under pressure higher than atmospheric be admitted to the pipe 57, it will escape from under the edges of the pan 58 and bubble through the oil to the top of the tank, creating a higher air pressure there than that assumed in the foregoing explanation, and causing oil to rise in the standpipe 55. If the pressure thus admitted to the pipe 57 is limited, the rise of oil in the standpipe will likewise be limited to the level at which a new balance is established between the column of oil therein plus the atmospheric pressure, on the one hand, and the column of oil in the tank plus the air pressure in the top of the tank on the other hand. Assuming, for instance, that the excess pressure, above atmospheric, of the air thus admitted is equal to a head of four inches of oil, then the oil in the standpipe will rise to a level $b$, which is four inches above the level $a$. In any case, whatever may be the pressure by the gauge of the air admitted into the pipe 57, the oil will rise in the standpipe until the column of a height $a$ to $b$ will balance this pressure. If pipe 56 is connected to the pressure air supply of the burner, the maximum pressure thus delivered will be that of the air for supporting combustion, and an equivalent column of oil will measure the maximum height of the level $b$.

By means of a reducing valve 65 in the air line, the actual or effective air pressure in the tank may be modified to any value less than the indicated maximum, and the height of the oil column in the standpipe will be correspondingly modified. A valve 66 in pipe 57 may be closed to permit oil being sucked in by pump 63 without also drawing in air from the line.

The burner is located at a level such that oil will flow to it when the level in the standpipe is at $b$, but not when the level there is at $a$. As the oil is consumed, the level $b$ subsides and disturbs the existing balance, but the balance is instantly restored by flow of more oil from the tank into the standpipe, a lowering of the air pressure in the top of the tank, and flow of more air through the pipe 57. Such disturbances and restoration of balance take place continuously as the oil is burned, with the result that there is a substantially constant flow of oil to the burner and the maintenance of an approximately constant level in the standpipe, with an approximately constant air pressure in the top of the tank and a constant flow of air thereto in the form of bubbles emerging from the edge of the inverted pan.

If, now, for any reason the air pressure should subside, for instance owing to the blower being shut down, the diminution of air pressure in the pipe 57 allows oil to rise in the chamber enclosed by the inverted pan, and the resulting reduction of air pressure in the top of the tank causes the oil in the standpipe to be sucked back into the tank, whereby the level in the standpipe is lowered. This effect takes place instantly, and if the air pressure drops wholly to the atmospheric pressure, the standpipe column subsides to the level $a$ and the fire is extinguished. If the air pressure drop is not so great as this, but still great enough to support a lower fire, the standpipe and burner may be so arranged that the corresponding lowering of the oil head in the column will cause feeding of a proportionately reduced amount of oil to the burner.

The inverted pan of large area performs an important function at this time. If it were not for this pan which forms, in effect, a horizontal enlargement at the orifice of the air pipe 57, a considerable volume of oil in the tank would remain to be drawn off, after subsidence of the air pressure, before the new balance which prevents further flow of the oil to the burner would be obtained. That is, after shutting off the combustion air, or reducing its pressure, oil would continue to flow to the burner at the former rate for an appreciable time, and in quantities too great to be wholly and efficiently burned. Smoke and obnoxious odors would then be produced and unburned oil might even fall to the furnace floor. Owing to the large horizontal area of the chamber 58, the displacement of oil necessary to establish the new balance when the air pressure drops, occurs wholly by flow into this chamber, and there remains no surplus oil under pressure such as would enable it to flow to the burner. Thus the flame at the burner is instantly extinguished when the air pressure wholly fails, or is instantly diminished to the proportionate quantity when the air pressure partially subsides.

I have already stated that I intend to protect the principles of this invention, so far as they are applicable, to control the flow of any liquid fuel to a burner, whether the fuel is specifically oil or any other liquid. Therefore, the appended claims are to be construed with this understanding, and all other liquid fuels capable of being controlled by the forms of apparatus hereinbefore described, or by equivalents thereof are to be understood as equivalent to oil. Likewise any other gas than air supplied from any source whatever is to be understood as equivalent to air when applied according to the principles of this invention to control the flow of such liquid fuel, unless a contrary meaning is required by the context.

What I claim and desire to secure by Letters Patent is:

1. In an oil burning apparatus, the combination with an oil conduit having connected legs forming, in series, two upright U-tubes and an intermediate inverted U-tube, of a container in which gas under pressure may be contained, and a pipe leading from said container to the upper part of said inverted U-tube and entering the same from above, together with means for supplying oil to such conduit at such pressure that, when the pneumatic pressure in the container is below a predetermined amount, oil may flow through said inverted U-tube, and when such pneumatic pressure is above such amount, an air lock is formed in the inverted U-tube preventing flow of oil therethrough.

2. In an oil burning apparatus, means for supplying air under pressure to support combustion, separate means for supplying oil to be burned including a conduit having a raised loop or inverted U-tube, means for delivering oil to said conduit under a pressure sufficient to cause flow of oil through said loop, and a connection from said air supplying means to the inverted loop adapted to apply air upon the oil in said loop at the pressure existing in that part of the air supplying means from which said connection is taken, and means for maintaining an oil seal in both legs of said loop.

3. An oil control for oil burning apparatus comprising means for delivering oil under pressure, a rising pipe to which oil is delivered by said means, a branch connection leading from said rising pipe to the combustion point, an inverted U-tube also in connection with said source of pressure and having its legs joined at a level lower than that of the said branch connection, a rising tube in series with said inverted U-tube, an overflow branch for the last-named rising tube at a level below that of the first-named branch connection, a container for gas under pressure, and means for connecting said container with the inverted U-tube for creating a pneumatic seal therein.

4. In oil burning apparatus the combination, with a source of oil, of a pair of connected U-tubes, one of which is connected with the oil source, branch pipes leading from the unconnected legs of both U-tubes, and a conduit adapted to contain air under pressure rising from the junction of the U-tubes.

5. In oil burning apparatus the combination, with a source of oil, of a pair of connected U-tubes, one of which is arranged to receive oil from said oil source, branch pipes leading from the unconnected legs of both U-tubes, and a conduit adapted to contain air under pressure rising from the junction of the U-tubes, one of the said branch pipes being at a higher level than the other and both being above the level of said junction.

6. In combination with an oil burner and a source of oil supply, means for controlling the delivery of oil from said source to said burner comprising a standpipe connected to said source, a branch pipe from said standpipe to the burner, the standpipe rising above its junction with said branch, an inverted U-tube or loop in series connection with said standpipe and said source, the highest point of which is lower than the outlet of said branch pipe, a conduit leading from a source of pneumatic pressure into said loop, and a rising pipe in series connection with said loop having an overflow outlet at a level lower than that of the first-named branch pipe.

7. An oil-controlling means for oil burning apparatus comprising the combination with a source of oil, of a pair of connected U-tubes in series with said oil source, the leg of said U-tubes most remote from such source having an overflow at a level above the junction point of the U-tubes, a source of pneumatic pressure in connection with the junction point of said U-tubes arranged to cause pneumatic pressure imposition on the liquid therein, and the U-tube leg nearest in such series to the oil source having a burner feeding branch at a level above that of said overflow.

8. In oil burning apparatus, an oil tank, a pump, a connection through which oil is adapted to flow to the pump from said tank, a return connection from the pump to the tank including an inverted U-tube and an upright U-tube in series, the latter having connection leading to the tank from a level above the oil level therein, a standpipe connected to said inverted U-tube between the latter and the pump, a branch-pipe leading from said standpipe at a level above that of the connection between said upright U-tube and the tank, a reservoir at a lower level than the tank having a chamber open to the atmosphere and a second chamber closed to the atmosphere, said chambers being connected together at a low level, a burner feed pipe leading from the lower part of the first chamber, and said branch pipe extending into the same chamber and adapted to feed oil thereto, means for admitting pneumatic pressure into the upper part of the second chamber, and a pipe leading from a low point in the last-named chamber to the top of said inverted U-tube, said pipe having a vent to the atmosphere of restricted area in proportion to the flow capacity of the pipe.

9. The combination with an oil burner, a supply tank at a level above said burner and a feed pump, of circulating connections through which oil is drawn by the pump from and returned to the tank, respectively and means for conveying oil from the pump to the burner under a pressure less than that imposed by the pump on the oil in returning it to the tank, comprising a chamber adapted to contain oil and having a feeding connection with the burner, a second chamber connected with the first chamber at a low level and closed to the atmosphere, whereby application of pneumatic pressure thereinto is adapted to transfer oil into the first chamber with rise of the oil level in the first chamber and lowering of the oil level in the second chamber, a standpipe connected with the pump to receive oil therefrom, a branch pipe leading to the first-named chamber from said standpipe at a level higher than that to which oil is forced by the pressure imposed in returning oil to the tank, and a pneumatic control connection governed by the level of the oil in the second-named chamber and adapted to transmit pneumatic pressure therefrom to the tank-return connection.

10. An oil controlling means as set forth in claim 8 combined with a burner at a low level relatively to the tank return, a reservoir to which oil is fed by said burner feeding branch and from which oil is delivered under gravity head to the burner and a closed chamber in under surface connection with said pneumatic pressure applying means and including provisions for disabling the last-named means.

11. In oil burning apparatus, a burner, a source of combustion air under pressure connected with said burner, a reservoir having two chambers in communication at a low level and containing oil, one of said chambers being closed to the atmosphere and in connection with said air source and the other being open to the atmosphere, whereby the air pressure raises the oil level in the second chamber above that of the first chamber, a connection from the second chamber to the burner having its delivery point at a level such that oil is discharged therefrom under the head of the high oil level in the second chamber and is not discharged when such oil is at its low level, a pipe extending downward into the first-named chamber and having an orifice adapted to be sealed by the oil therein when such oil is at a given level, and to be unsealed when such oil subsides to a lower level, and means operated by air flowing through said pipe when its orifice is thus unsealed to cause delivery of oil to the second chamber, and to intermit such delivery when said pipe orifice is so sealed.

12. In combination with a burner, a reservoir having two chambers in communication at a low level, one of which is open to the atmosphere and is connected to deliver oil to the burner when the oil level in such chamber is above a stated height and to cease such delivery when said level is below such height, the second of said chambers being closed to the atmosphere, a source of pneumatic pressure coupled to said second chamber, a pipe rising from within the last-named chamber and having an orifice adapted to be sealed and unsealed, respectively, by rise and descent of the oil level in said chamber, means for conducting oil to the first chamber of said reservoir, and a pneumatic control operated by difference of air pressure in said pipe for permitting flow of oil through said conducting means when said orifice is unsealed and for interrupting such flow when the orifice is sealed.

13. A fuel control for oil burners comprising a chamber closed to the external atmosphere, adapted to contain oil, a conduit for air under pressure leading to said chamber, an air conduit leading from said chamber, one of said conduits being adapted to be sealed by oil at a certain level in said chamber and to be opened by subsidence of oil to a lower level, a second chamber in connection with the foregoing chamber at a level below said sealing level and adapted to contain oil, the oil in the second chamber being raised to a higher level than in the first chamber when air pressure is applied in the first chamber, and means for delivering, and interrupting flow of, oil into the second chamber under control of the air pressure in the first chamber.

14. A fuel control for oil burners comprising a chamber closed to the external atmosphere, adapted to contain oil, a conduit for air under pressure leading to said chamber, an air conduit leading from said chamber, one of said conduits being adapted to be sealed by oil at a certain level in said chamber and to be opened by subsidence of oil to a lower level, a second chamber in connection with the foregoing chamber at a level below the said sealing level and adapted to contain oil, the oil in the second chamber being raised to a higher level than in the first chamber when air pressure is applied in the first chamber, means for delivering oil to said second chamber, and an inverted loop in said delivering means connected with the air conduit leading from the first chamber.

15. In an oil burning apparatus according to claim 4, the combination therewith of a chamber in connection with said conduit adapted to contain oil and adapted to close or open said conduit by rise or descent, respectively, of the oil, and means for delivering air under pressure to said chamber.

16. In an oil burning apparatus according to claim 5, the further combination of connected chambers at a lower level than said source of oil, one of said chambers being closed to the atmosphere and the other chamber being open to the atmosphere, the connection between the chambers being below the oil level in them, the said conduit extending downward into the first chamber, the higher of said branch connections being extended to deliver oil into the second of said chambers, and means for admitting air under pressure to the first chamber.

17. The combination set forth in claim 6 in further combination with a chamber at a lower level than said oil supply in feeding connection with said burner and arranged to receive oil delivered from the said branch, a second chamber closed to the atmosphere and in connection with the first chamber below the oil level therein, the said conduit being extended into said second chamber and having an orifice adapted to be closed or opened by rise or subsidence of the oil in the latter chamber, and a connection from a source of pneumatic pressure opening into said second chamber.

18. An oil controlling means according to claim 7 and comprising further a chamber closed to the atmosphere and a conduit between said source of pneumatic pressure and the said junction point of the U-tubes, said conduit having an orifice within the chamber adapted to be sealed or opened by rise or descent of liquid in said chamber, a second chamber open to the atmosphere arranged to receive oil from the said burner feeding branch, and being in connection with the first chamber below the oil level, whereby oil delivered to the second chamber flows into the first chamber, and is maintained at a higher level in the second chamber by pneumatic pressure in the first chamber.

19. In an oil burning apparatus, the combination with an air pressure supply and an oil conduit including connected U-tubes having an inverted loop at their junction, of means for conducting air from said air pressure supply to said junction to create in the latter an air lock preventing flow of oil.

20. The combination, with an oil burner having an oil delivering nozzle and an air conduit for supplying air under pressure in proximity to the delivering point of said nozzle, of a pipe line having rising legs connected so as to form an inverted loop or U-tube and sealing legs for said loop, means for supplying oil to said pipe line at a point and under a pressure such that the oil is caused to flow through such inverted loop and sealing legs, and means for applying pneumatic pressure to the high part of such inverted loop sufficient to cause an air lock in the loop.

21. An apparatus for burning liquid fuel and controlling the feed of such fuel comprising, in combination with a burner and provisions for supplying air under pressure to said burner, a fuel pipe leading toward said burner, a double U-tube having a leg connected to said fuel pipe and extending above said connection, means for delivering fuel into said leg, and a connection from the air supplying means to the double U-tube; said double U-tube including an inverted bend to the top of which said air connection is joined, a sealing bend at the opposite side of the inverted bend from said leg, and an overflow outlet from the outer leg of said sealing bend.

22. An apparatus for burning and regulating the feed of liquid fuel comprising a burner, a fuel pipe leading to said burner, an air pipe for conducting air under pressure to said burner, a feed regulator consisting of a double U-tube having an inverted bend, a sealing bend with an overflow outlet and a leg rising above said inverted bend and overflow outlet, said fuel conducting pipe being connected to said leg, means for delivering liquid fuel into said double U-tube including said leg, and means for applying the pressure of air in the air pipe to said inverted bend.

23. An apparatus for burning and regulating the feed of liquid fuel comprising in combination with an air conduit adapted to contain air under pressure and arranged to conduct air to the burner, a damper in said conduit adapted to obstruct or permit flow of air to the burner according to its position, an oil feed controller comprising a double U-tube having an inverted bend, means for delivering the liquid fuel into said U-tube and causing the fuel to flow through said bend, and an air connection between said conduit and the highest part of said inverted bend.

24. In oil burning apparatus, an oil tank, a pump, a connection through which oil is adapted to flow to the pump from said tank, a return connection from the pump to the tank including an inverted U-tube and an upright U-tube in series, the latter having connection leading to the tank from a level above the oil level therein, a standpipe connected to said inverted U-tube between the latter and the pump, a branch pipe leading from said standpipe at a level above that of the connection between said upright U-tube and the tank, a reservoir at a lower level than the tank having a chamber open to the atmosphere and a second chamber closed to the atmosphere, said chambers being connected together at a low level, a burner feed pipe leading from the lower part of the first chamber and said branch pipe extending into the same chamber and adapted to feed oil thereto, and connections arranged to lead air under predetermined pressure into said second chamber and to lead air from the same chamber to the top of said inverted U-tube, said connections being arranged to be so obstructed by rise of oil in said chamber as to prevent flow of air therethrough, and to be opened by descent of such oil whereby to permit passage of air to said inverted U-tube.

25. In oil burning apparatus, an oil tank, a pump, a connection through which oil is adapted to flow to the pump from said tank, a return connection from the pump to the tank including an inverted U-tube and an upright U-tube in series, the latter having connection leading to the tank from a level above the oil level therein, a standpipe connected to said inverted U-tube between the latter and the pump, a branch pipe leading from said standpipe at a level above that of the connection between said upright-tube and the tank, a reservoir at a lower level than the tank having a chamber open to the atmosphere and a second chamber closed to the atmosphere, said chambers being connected together at a low level, a burner feed pipe leading from the lower part of the first chamber, and said branch pipe extending into the same chamber and adapted to feed oil thereto, a source of pneumatic pressure and pipes leading, respectively, into said second chamber from said pneumatic pressure source and from the said second chamber to the top of said inverted U-tube, one of the last named pipes having its orifice in the chamber at so low a level that flow of air therethrough is prevented by rise, and permitted by descent, of the oil level in the chamber.

26. The combination, in an oil burning apparatus, of separate air and oil conduits, the oil conduit having connected legs forming, in effect, a double U-tube containing an intermediate inverted loop, and a pipe connection rising from the upper part of such inverted loop and extending into connection with the air conduit.

27. In an oil burning apparatus, an air supplying conduit, rising pipe sections connected at low points to form, in effect, two upright U-tubes with one leg of each connected to a leg of the other to form an inverted loop, an oil conduit connected with and leading away from the second leg of one of said U-tubes, means for supplying oil to the last named U-tube, an overflow pipe leading from the second leg of the other upright U-tube at a level below that to which the said oil conduit is connected to the before-mentioned U-tube, the top of the inverted loop being lower than said overflow connection, and a pipe rising from the inverted loop and extending into connection with said air conduit.

28. An oil flow control for oil burners comprising a pair of connected U-tubes, a supply conduit leading to said connected U-tubes and an outlet conduit leading from them, and means for imposing pneumatic pressure in the junction of said U-tubes.

29. In oil burning apparatus, an oil tank, a pump, a connection through which oil is adapted to flow to the pump from said tank, a return connection from the pump to the tank including an upright U-tube, an inverted U-tube and a sealing U-tube in series, the latter having a connection leading to the tank from a level above the oil level in the tank, a standpipe forming part of said upright U-tube arranged to receive oil from the pump, a burner-feeding branch issuing from said standpipe at a height above the connection of said upright U-tube with the pump, and means for applying pneumatic pressure in the inverted U-tube, whereby to cause rise of oil in said standpipe up to said burner-feeding branch.

30. A fuel control for oil burners, in combination with an oil tank and a burner at a low level relatively to the tank, comprising a pump having a suction connection and a return connection with the tank, said return connection including an inverted loop and a sealing U-tube, a gravity oil reservoir in connection with the burner, a standpipe in connection with said inverted loop and having a connection leading from a point above said loop to the reservoir, means for conducting air under pressure to the loop so as to control oil flow to the reservoir, and means whereby rise or descent of the oil level in such reservoir permits or prevents application of air pressure in said loop.

31. An oil flow control according to claim 28 combined with a gravity feed tank arranged to receive oil from said outlet conduit, and an oil seal interposed in the means for imposing pressure in the junction of said U-tubes; said oil seal being in connection with said gravity tank and operated by changes of level of the oil in said tank.

32. The combination of two rising legs and an intermediate inverted loop, adapted to contain liquid, and provisions for applying pneumatic pressure in the bend of the inverted loop with intensity sufficient to support a column of such liquid in said rising legs to a height above said bend.

33. The combination of two upright U-tubes adapted to receive liquid, connected together and forming an intermediate inverted loop, and means for delivering compressed air to the high part of said inverted loop.

34. The combination of two upright U-tubes adapted to receive liquid, one leg of each U-tube being connected to a leg of the other, forming an inverted loop, and the other leg of each U-tube rising above the junction of said connected legs, with means for conveying liquid to one of said U-tubes, and means for delivering compressed air to the junction between the legs of the inverted loop at a pressure such that the liquid in the outer leg of the upright U-tube to which liquid is so conveyed must accumulate into a column of predetermined height before the liquid can overflow said junction.

In testimony whereof I have affixed my signature.

CECIL W. STANCLIFFE.